United States Patent
Sugiyama (10) Patent No.: US 9,073,541 B2
(45) Date of Patent: Jul. 7, 2015

(54) POWER SOURCE SYSTEM FOR VEHICLE, VEHICLE, AND VEHICLE CONTROL METHOD

(71) Applicant: Yoshinobu Sugiyama, Toyota (JP)

(72) Inventor: Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/158,263

(22) Filed: Jan. 17, 2014

(65) Prior Publication Data

US 2014/0214251 A1 Jul. 31, 2014

(30) Foreign Application Priority Data

Jan. 25, 2013 (JP) ................................. 2013-011793

(51) Int. Cl.
*B60W 20/00* (2006.01)
*B60W 10/06* (2006.01)
*B60W 10/08* (2006.01)
*B60K 6/445* (2007.10)
*B60W 10/26* (2006.01)
*B60W 30/18* (2012.01)
*H02J 1/00* (2006.01)

(52) U.S. Cl.
CPC ............... *B60W 20/00* (2013.01); *B60W 10/06* (2013.01); *B60W 10/08* (2013.01); *Y10S 903/93* (2013.01); *B60W 20/106* (2013.01); *B60K 6/445* (2013.01); *B60W 10/26* (2013.01); *B60W 30/18054* (2013.01); *B60W 2510/244* (2013.01); *H02J 2001/008* (2013.01); *Y02T 10/6239* (2013.01)

(58) Field of Classification Search
None
See application file for complete search history.

(56) References Cited

U.S. PATENT DOCUMENTS

| 2006/0038532 A1* | 2/2006 | Taniguchi ..................... 320/103 |
| 2010/0198440 A1* | 8/2010 | Fujitake .......................... 701/22 |
| 2010/0244782 A1* | 9/2010 | Nagayama et al. ........... 320/162 |
| 2014/0176085 A1* | 6/2014 | Maruno et al. ................ 320/162 |

FOREIGN PATENT DOCUMENTS

| JP | A-2005-248744 | 9/2005 |
| JP | A-2010-183758 | 8/2010 |
| JP | A-2010-206885 | 9/2010 |

* cited by examiner

*Primary Examiner* — Fadey Jabr
*Assistant Examiner* — Krishnan Ramesh
(74) *Attorney, Agent, or Firm* — Oliff PLC (57) ABSTRACT

A power source system for a vehicle includes a first power storage device, a second power storage device, a voltage converter, and a controller. The controller is configured to (a) execute a charging control in which the second power storage device is charged by the voltage converter when a parking time of the vehicle exceeds a predetermined period of time, (b) estimate a decrease amount in a state of charge of the first power storage device in a time period from after elapse of the predetermined period of time until a start of the vehicle, (c) set a lower limit of the state of charge based on the decrease amount, and (d) not execute the charging control when the state of charge is lower than the lower limit.

10 Claims, 8 Drawing Sheets

POWER SOURCE SYSTEM FOR VEHICLE, VEHICLE, AND VEHICLE CONTROL METHOD

INCORPORATION BY REFERENCE

The disclosure of Japanese Patent Application No. 2013-011793 filed on Jan. 25, 2013 including the specification, drawings and abstract is incorporated herein by reference in its entirety.

BACKGROUND OF THE INVENTION

1. Field of the Invention

The invention relates to a power source system for a vehicle, a vehicle, and a vehicle control method.

2. Description of Related Art

Japanese Patent Application Publication No. 2010-206885 (JP 2010-206885 A) discloses a charging control device for a vehicle that can charge a low-voltage battery, which supplies power to onboard electric components, from a high-voltage battery which is a power source of the vehicle. In such a charging control device, where the voltage of the low-voltage battery is equal to or lower than a predetermined threshold in a power feed mode in which the vehicle does not run, the low-voltage battery is charged using the power stored in the high-voltage battery.

In the charging control device, where the state of charge (SOC) of the high-voltage battery is equal to or less than a lower limit value, the low-voltage battery is not charged from the high-voltage battery. The lower limit value of the SOC of the high-voltage battery is set to a level of the SOC which is minimum necessary to start the engine in the case of a hybrid vehicle (HV) in which the high-voltage battery can be charged by a generator driven by an engine (see JP 2010-206885 A).

SUMMARY OF THE INVENTION

Even when the vehicle is parked, the battery SOC can decrease due to self-discharge or power consumption on equalization among the cells. In the above-mentioned charging control device, the lower limit value of the SOC of the high-voltage battery is set with consideration for such decrease in the SOC. However, where the lower limit value of the SOC is set to an unnecessarily high value to prevent the high-voltage battery from overdischarge, the charging of the low-voltage battery from the high-voltage battery can be unnecessarily restricted. As a result, the frequency of cases in which the low-voltage battery is depleted (flat battery) can increase.

The invention relates to a power source system for a vehicle, which includes a first power storage device that stores power for running the vehicle, and a second power storage device, which stores power for auxiliary devices, and provides a technique for more reliably suppressing the depletion of power in the second power storage device.

According to a first aspect of the invention, a power source system for a vehicle, the power source system includes a first power storage device, a second power storage device, a voltage converter, and a controller. The first power storage device is configured to store power to be used for running the vehicle. The second power storage device is configured to store power to be used for an auxiliary device. The voltage converter is provided between the first power storage device and the second power storage device. The voltage converter is configured to perform voltage conversion of power output from the first power storage device and charge the second power storage device. The controller is configured to (a) execute a charging control in which the second power storage device is charged by the voltage converter when a parking time of the vehicle exceeds a predetermined period of time, (b) estimate a decrease amount in a state of charge of the first power storage device in a time period from after elapse of the predetermined period of time until a start of the vehicle, (c) set a lower limit of the state of charge based on the decrease amount, and (d) not execute the charging control when the state of charge is lower than the lower limit.

In the power source system, the controller may be configured to execute the charging control in a case where the state of charge is equal to or greater than the lower limit when the parking time of the vehicle exceeds the predetermined period of time, and may be configured not to execute the charging control in a case where the state of charge is less than the lower limit when the parking time exceeds the predetermined period of time.

The power source system may further include an input device. The input device may be configured to set, by a user input, a scheduled parking time that extends from a time at which parking of the vehicle is initiated until a time at which the vehicle is started. The controller may be configured to calculate the time period from when the predetermined period elapses until the start of the vehicle by subtracting the predetermined period of time from the scheduled parking time.

The controller may further include a detector. The detector may be configured to detect information relating to an air temperature outside the vehicle. The controller may be configured to adjust the lower limit of the state of charge based on the information relating to the air temperature outside the vehicle.

In the power source storage system, the controller may be configured to adjust the lower limit of the state of charge so as to increase in proportion to a decrease in the outside air temperature.

In the power source storage system, the first power storage device may supply power to a starter of the vehicle which starts an internal combustion engine of the vehicle. The controller may be configured to set the lower limit of the state of charge based on the decrease amount and the state of charge at which the internal combustion engine is started by the starter.

The power source storage system may further include a detector. The detector may be configured to detect information relating to an air temperature outside the vehicle. The controller may be configured to set a first power and a second power based on the information relating to the air temperature outside the vehicle. The controller may be configured to set the state of charge at which the internal combustion engine is started based on the first power and the second power, the first power is power necessary to start the internal combustion engine, and the second power is power output by the first power storage device.

In the power source storage system, the controller may be configured to set the first power to increase and the second power to decrease in proportion to a decrease in the outside air temperature.

According to a second aspect of the invention, a vehicle includes a power source system and a drive device. The drive device is configured to receive power from the power source system to generate drive power. The power source system includes a first power storage device, a second power storage device, a voltage converter and a controller. The first power storage device is configured to store power to be used for running the vehicle. The second power storage device is configured to store power to be used for an auxiliary device. The voltage converter is provided between the first power storage device and the second power storage device. The voltage converter is configured to perform voltage conversion of power output from the first power storage device and charge the second power storage device. The controller is configured to (a) execute a charging control in which the second power storage device is charged by the voltage converter when a parking time of the vehicle exceeds a predetermined period of time, (b) estimate a decrease amount in a state of charge of the first power storage device in a time period from after elapse of the predetermined period of time until start of the vehicle, (c) set a lower limit of the state of charge based on the decrease amount, and (d) not execute the charging control when the state of charge is lower than the lower limit.

The third aspect of the invention is a control method for a vehicle. The vehicle includes a first power storage device and a second power storage device. The first power storage device is configured to store power to be used for running the vehicle. The second power storage device is configured to store power to be used for an auxiliary device. The control method including: performing voltage conversion of power output from the first power storage device with a voltage converter; charging the second power storage device with the power converted by the voltage converter in a case where a parking time of the vehicle exceeds a predetermined period of time; and performing no charging of the second power storage device when a state of charge of the first power storage device is lower than a lower limit of the state of charge, the lower limit determined based on a decrease amount of the state of charge estimated to occur within a time period from when elapse of the predetermined period of time until a star of when the vehicle.

With the above-described features, the decrease amount of the state amount of the first power storage device is estimated within a period from after the parking time of the vehicle exceeds the predetermined period of time until the vehicle is started. The lower limit of the state amount of the first power storage device is set based on the estimated decrease amount. Thus, it is not necessary to set an unnecessarily high lower limit of the state amount in order to prevent the first power storage device from overdischarge, and whether or not to perform charging control of the second power storage device can be adequately determined by taking into account the decrease amount of the state amount within the period of time until the vehicle is started. Therefore, the depletion of power in the second power storage device can be suppressed more reliably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention are described hereinbelow with reference to the appended drawings. In the drawings, like or corresponding components are assigned with like reference numerals and the explanation thereof is herein omitted.

Figure 1:
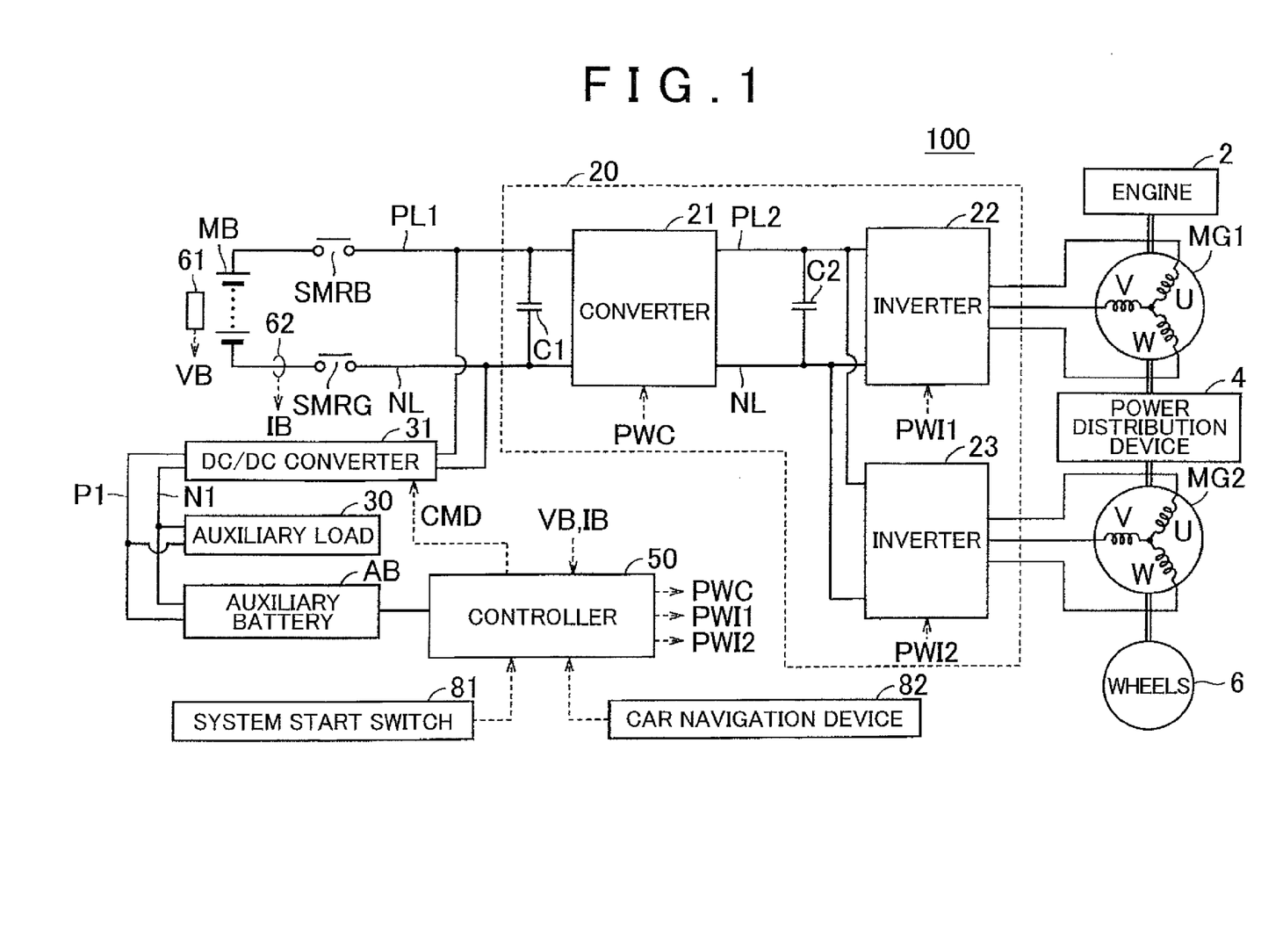
FIG. 1 shows the entire configuration of the vehicle carrying the power source system according to Embodiment 1 of the invention.

FIG. 1 illustrates the configuration of a vehicle carrying the power source system according to Embodiment 1 of the invention. Referring to FIG. 1, a vehicle 100 is provided with an engine 2, motor generators (MGs), i.e., MG1 and MG2, a power distribution device 4, wheels 6, a power control unit (PCU) 20, a main power storage device MB, system main relays SMRB, SMRG, a voltage sensor 61, and a current sensor 62. The vehicle 100 is also provided with an auxiliary battery AB, an auxiliary load 30, a direct current/direct current (DC/DC) converter 31, a controller 50, a system start switch 81, and a car navigation device 82.

The vehicle 100 carries the MG1, MG2 and the engine 2 as drive sources. The power distribution device 4 connects the drive shaft of the engine 2, the MG1, and the drive shaft of the wheels 6. The power generated by the engine 2 is distributed by the power distribution device 4 to two paths, namely, a path for transmitting power to the drive shaft of the wheels 6 and a path for transmitting power to the MG1.

The MG1 mainly operates as a generator driven by the engine 2 and is installed on the vehicle 100 to operate as a start motor of the engine 2. The MG2 is connected to the drive shaft of the wheels 6 and installed on the vehicle 100 as a motor for driving the wheels 6. A reducer may be introduced between the MG2 and the drive shaft of the wheels 6.

The power distribution device 4 is constituted by a planetary gear system including a sun gear, a pinion gear, a carrier, and a ring gear. The pinion gear meshes with the sun gear and the ring gear. The carrier rotatably supports the pinion gear and is connected to the crankshaft of the engine 2. The sun gear is connected to the rotating shaft of the MG1. The ring gear is connected to the drive shaft of the wheels 6 (or to the rotating shaft of the MG2).

The main power storage device MB is a rechargeable DC power source constituted, for example, by a secondary battery such as a nickel hydride secondary battery or a lithium ion secondary battery, or an electric double-layer capacitor. The voltage of the main power storage device MB is, for example, about 200 V The main power storage device MB stores power that is used for running the vehicle and supplied to the MG1 and MG2. The main power storage device MB is charged by receiving from the PCU 20 the power generated by the MG1 and MG2.

Where the vehicle 100 is maintained in a parked state for a predetermined period of time (for example, for 12 days), the power accumulated in the main power storage device MB is supplied to the auxiliary battery AB and the auxiliary battery AB is charged. The "parking", as referred to herein, means a state in which the system start switch 81 is switched OFF, thereby stopping the vehicle system.

The voltage sensor 61 detects the voltage VB of the main power storage device MB and outputs the detected value to the controller 50. The current sensor 62 detects the current IB input/output to/from the main power storage device MB and outputs the detected value to the controller 50.

The system main relay SMRB is connected between the positive electrode of the main power storage device MB and a positive electrode line PL1. The system main relay SMRG is connected between the negative electrode of the main power storage device MB and a negative electrode line NL. The system main relays SMRB, SMRG are switched ON/OFF in response to a signal from the controller 50. A precharge circuit for preventing the inrush current from flowing from the main power storage device MB to the PCU 20 is provided in parallel with either of the system main relays SMRB, SMRG (this configuration is not shown in the figure).

The PCU 20 includes a converter 21, inverters 22, 23, and smoothing capacitors C1, C2. The converter 21 is provided between the positive electrode line PL1 and a positive electrode line PL2. The converter 21 boosts the voltage between the positive electrode line PL2 and the negative electrode line NL to or higher than the voltage between the positive electrode line PL1 and the negative electrode line NL (that is, output voltage of the main power storage device MB) on the basis of a signal PWC from the controller 50. The converter 21 is constituted, for example, by a boosting chopper circuit of a reversible current type.

The inverters 22, 23 are connected to the positive electrode line PL2 and the negative electrode line NL. The inverter 22 converts the alternate current (AC) power generated by the MG1 by using the output of the engine 2 into DC power on the basis of a signal PWI1 from the controller 50 and outputs the converted DC power to the positive electrode line PL2. Further, when the engine 2 is started by the MG1, the inverter 22 converts the DC power received from the positive electrode line PL2 into AC power and outputs the converted AC power to the MG1. The inverter 23 converts the DC power received from the positive electrode line PL2 into AC power on the basis of a signal PWI2 from the controller 50 and outputs the converted AC power to the MG2. The inverters 22, 23 are each constituted, for example, by a bridge circuit including a three-phase power semiconductor switching element.

The MG1 and MG2 are each an AC motor constituted, for example, by an AC synchronous motor of a permanent magnet type in which permanent magnets are embedded in a rotor. The MG1 generates AC power by using power of the engine 2 received through the power distribution device 4, and outputs the generated AC power to the inverter 22. Further, the MG1 generates a torque for cranking the engine 2 by the AC power received from the inverter 22 when the engine 2 is started. Thus, the MG1 functions as a power generation device that generates power by using the power of the engine 2 and also functions as a starter that starts the engine 2 by receiving the power from the main power storage device MB and driving the engine 2. The MG2 generates a torque for driving the wheels 6 by the AC power received from the inverter 23.

The smoothing capacitor C1 is electrically connected between the positive electrode line PL1 and the negative electrode line NL and smoothens the AC component of voltage fluctuations between the positive electrode line PL1 and the negative electrode line NL. The smoothing capacitor C2 is electrically connected between the positive electrode line PL2 and the negative electrode line NL and smoothens the AC component of voltage fluctuations between the positive electrode line PL2 and the negative electrode line NL.

The DC/DC converter 31 is connected between the positive electrode line PL1 and the negative electrode line NL and between a positive electrode line P1 and a negative electrode line N1. The auxiliary battery AB and the auxiliary load 30 are connected to the positive electrode line P1 and the negative electrode line N1. Thus, the DC/DC converter 31 is provided between the main power storage device MB and the auxiliary battery AB. The DC/DC converter 31 also performs voltage conversion (reduction) of the power output from the main power storage device MB on the basis of a signal CMD from the controller 50 and charges the auxiliary battery AB by the converted power.

The auxiliary load 30 represents the combination of various auxiliary devices installed on the vehicle 100. The auxiliary battery AB is a rechargeable DC power source and is constituted, for example, by a secondary battery such as a lead secondary battery, nickel hydride secondary battery, or a lithium ion secondary battery. The voltage of the auxiliary battery AB is lower than the voltage of the main power storage device MB and is, for example, about 12 V. A capacitor may be used instead of the auxiliary battery AB. The auxiliary battery AB stores the power supplied from the DC/DC converter 31 and supplies the stored power to the auxiliary load 30 and the controller 50. Since the auxiliary battery AB supplies operation power to the controller 50, where the amount of power stored in the auxiliary battery AB decreases, the controller 50 is unlikely to operate. As a result, it is difficult for the vehicle 100 to operate.

The controller 50 controls the system main relays SMRB, SMRG, the PCU 20, the engine 2, and the DC/DC converter 31 by software processing that executes the program, which has been stored in advance, with a central processing unit (CPU) and/or hardware processing performed by an electronic circuit.

As one of the main control procedures executed by the controller 50, the controller 50 executes the control of preventing the auxiliary battery AB from being depleted while the vehicle 100 is parked. Thus, the auxiliary battery AB is charged by the power stored in the aforementioned main power storage device MB while the vehicle 100 is parked. Generally speaking, the controller 50 measures the parking time of the vehicle 100, and where the parking time exceeds a predetermined period of time (for example, 12 days), the controller generates a signal CMD for driving the DC/DC converter 31 and outputs the generated signal to the DC/DC converter 31.

Where the auxiliary battery AB is charged using the main power storage device MB while the vehicle is parked, regardless of the decrease in the SOC of the main power storage device MB, the MG1 may be unable to start the engine 2 by using the main power storage device MB after the next start of the vehicle system. Accordingly, the controller 50 sets the lower limit of the SOC of the main power storage device MB as the execution condition for charging the auxiliary battery AB while the vehicle is parked and does not execute the charging of the auxiliary battery AB while the vehicle is parked when the SOC is lower than the preset lower limit.

In this case, the controller 50 sets the lower limit of the SOC of the main power storage device MB (referred to hereinbelow as "lower limit SOC") as the execution condition for charging the auxiliary battery AB while the vehicle is parked. The lower limit SOC is set on the basis of the decrease amount of the SOC of the main power storage device MB in a time period from when the aforementioned period of time elapses till when the vehicle 100 is started next time (referred to hereinbelow as "remaining period of time"). As an example, the controller 50 takes a value obtained by adding the SOC decrease amount in the remaining period of time till when the vehicle 100 is started to the lowest limit SOC necessary to start the engine 2 (referred to hereinbelow as "SOC required to start the engine") as the lower limit SOC. The remaining period of time is calculated on the basis of the number of parking days that is set by the user in the car navigation device 82. The SOC decrease amount is calculated on the basis of the decrease rate that is set in advance with consideration for power consumption caused by self-discharge or equalization among the cells.

The system start switch 81 is used by the user to start/stop the vehicle system and corresponds to an ignition key (an ignition key may be used instead of the system start switch 81). Where the user switches ON the system start switch 81, the system start switch 81 outputs a start command instructing the controller 50 to start the system of the vehicle 100. Further, where the user switches OFF the system start switch 81, the system start switch 81 outputs a stop command instructing the controller 50 to stop the system of the vehicle 100.

The car navigation device 82 displays the traveling route of the vehicle 100. The car navigation device 82 is configured to allow the user to input various settings. In Embodiment 1, the car navigation device is configured to allow the user to input the scheduled parking time of the vehicle 100 (the period of time in which the vehicle system is maintained and allowed to stay in the stopped state). Where the user inputs the scheduled parking time (for example, the number of parking days) of the vehicle 100, the car navigation device 82 outputs the input value to the controller 50.

Figure 2:
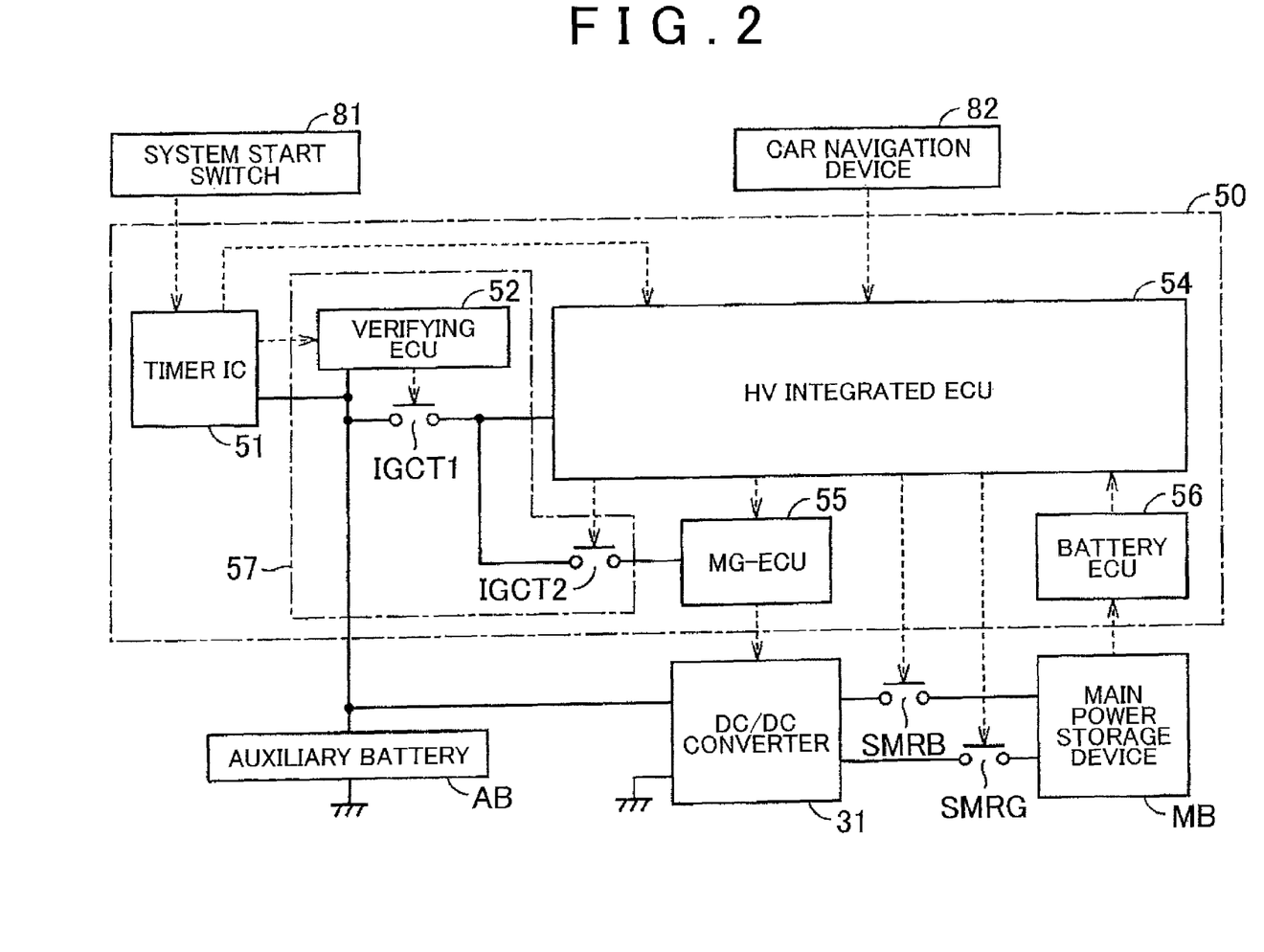
FIG. 2 shows in detail the configuration of the controller shown in FIG. 1.

FIG. 2 illustrates in detail the configuration of the controller 50 shown in FIG. 1. Referring to FIG. 2, the controller 50 includes a timer integrated circuit (IC) 51, a verifying ECU 52, a HV integrated ECU 54, a MG-ECU 55, a battery ECU 56, and switches IGCT1, IGCT2.

The controller 50 receives the operation power from the auxiliary battery AR The operation power is supplied at all times to the timer IC 51 and the verifying ECU 52. The operation power is also supplied to the HV integrated ECU 54 and the MG-ECU 55 through the switch IGCT1 and the switch IGCT2, respectively. The switches IGCT1, IGCT2 may be mechanical such as relay, or in the form of semiconductor elements such as transistors.

The verifying ECU 52 and the switches IGCT1. IGCT2 operate as a power source control unit 57 that controls the supply of power to the MV integrated ECU 54 and the MG-ECU 55. The verifying ECU 52 verifies whether or not a signal from a remote key (not shown in the figure) conforms to the vehicle 100. When the verification result indicates the conformity, the verifying ECU 52 energizes the switch IGCT1. As a result, the operation power is supplied from the auxiliary battery AB to the HV integrated ECU 54 and the HV integrated ECU 54 is started.

Where the HV integrated ECU 54 is started, the HV integrated ECU 54 energizes the switch IGCT2. As a result, the operation power is supplied from the auxiliary battery AB to the MG-ECU 55, and the MG-ECU 55 is started. Further, the HV integrated ECU 54 receives the set value of the number of parking days of the vehicle 100 from the car navigation device 82 and receives the measured value of the parking time from the timer IC 51. Further, the HV integrated ECU 54 receives a signal indicating the state of the main power source device MB (detected values of voltage or current of the main power storage device MB) from the battery ECU 56. The HV integrated ECU 54 controls the system main relays SMRB, SMRG and the MG-ECU 55 on the basis of the received signals.

The battery ECU 56 monitors the state of the main power source device MB. The battery ECU 56 calculates the SOC of the main power source device MB on the basis of the detected values of voltage and current of the main power source device MB and outputs the calculation result to the HV integrated ECU 54. The MG-ECU 55 controls the DC/DC converter 31 and the PCU 20 (FIG. 1) under the control from the HV integrated ECU 54.

As described hereinabove, since the controller 50 receives the operation power from the auxiliary battery AB, where the amount of power stored in the auxiliary battery AB decreases, the operation of the controller 50 is hindered. As a result, it can be difficult to operate the vehicle 100. Where the vehicle 100 is allowed to stay in the system stop state, the amount of power stored in the auxiliary battery AB decreases with the passage of time. Accordingly, when the vehicle 100 is not started for a long time, the aforementioned charging of the auxiliary battery AB is executed while the vehicle is parked, in order to restore the charge amount of the auxiliary battery AB in which the amount of stored power has reduced.

The timer IC 51 measures the time elapsed since the system of the vehicle 100 has been stopped by switching OFF the system start switch 81, that is, the parking time, and outputs the measured value to the HV integrated ECU 54. Further, the timer IC 51 generates the execution timing for charging the auxiliary battery AB while the vehicle is parked. Thus, where a predetermined time that has been set in the built-in memory elapses since the system start switch 81 has been switched OFF, the timer IC 51 outputs a start command to the verifying ECU 52.

Where the start command is received from the timer IC 51, the verifying ECU 52 energizes the switch IGCT1 even if there is no signal from the remote key. As a result, the operation power is supplied from the auxiliary battery AB to the HV integrated ECU 54, and the HV integrated ECU 54 is started. The HV integrated ECU 54 determines whether the charging of the auxiliary battery AB can be executed or not while the vehicle is parked on the basis of the SOC of the main power storage device MB. Where it is determined that the charging of the auxiliary battery AB can be executed while the vehicle is parked, the HV integrated ECU 54 energizes the switch IGCT2 and the system main relays SMRB, SMRG and outputs a drive command instructing to drive the DC/DC converter 31 to the MG-ECU 55. Meanwhile, where it is determined that the charging of the auxiliary battery AB cannot be executed while the vehicle is parked, the HV integrated ECU 54 does not energize the switch IGCT2 or the system main relays SMRB, SMRG and does not execute the charging of the auxiliary battery AB while the vehicle is parked.

The configuration of the controller 50 shown in FIG. 2 is exemplary and can be variously changed. Further, the controller 50 shown in FIG. 2 includes a plurality of ECU, but the controller 50 may be configured of a smaller number of ECU by integrating some of the ECU, or the controller 50 may be configured, conversely, of a larger number of ECU.

Figure 3:
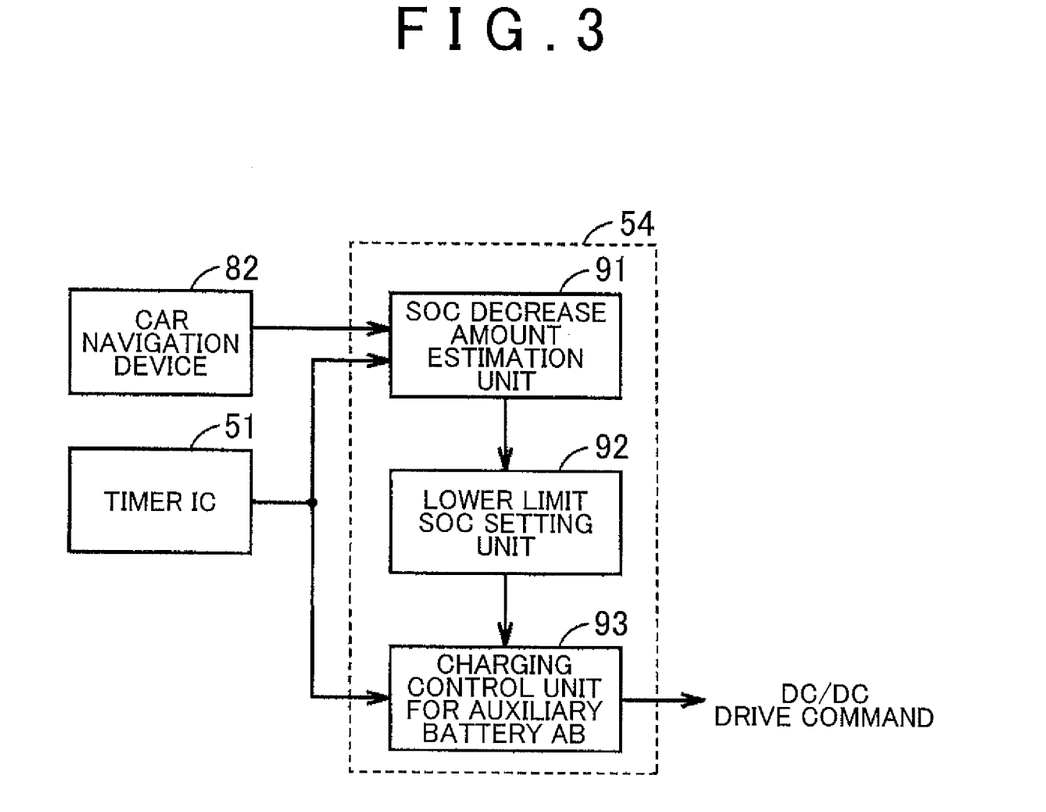
FIG. 3 is a functional block diagram of the portion of the HV integrated electronic control unit (ECU) shown in FIG. 2, which relates to charging the auxiliary battery AB while the vehicle is parked by using the power stored in the main power storage device MB.

FIG. 3 is a functional block diagram of the portion of the HV integrated ECU 54 shown in FIG. 2, which relates to charging the auxiliary battery AB while the vehicle is parked. Referring to FIG. 3, the HV integrated ECU 54 includes a SOC decrease amount estimation unit 91, a lower limit SOC setting unit 92, and a charging control unit 93 for the auxiliary battery AB.

The SOC decrease amount estimation unit 91 estimates the decrease amount of the SOC of the main power storage device MB in the remaining period of time till when the vehicle 100 is started next time. More specifically, the SOC decrease amount estimation unit 91 receives the set value of the number of parking days, which has been set by the user, from the car navigation device 82. Further, the SOC decrease amount estimation unit 91 receives the measured value of the parking time elapsed since the system start switch 81 has been switched OFF from the timer IC 51. Then, the SOC decrease amount estimation unit 91 calculates the remaining period of time by subtracting the measured value of the parking time measured by the timer IC 51 from the set value of the number of parking days, which has been set by the user, and calculates the SOC decrease amount within the remaining period of time by using a preset decrease rate.

The lower limit SOC setting unit 92 sets the lower limit SOC for determining whether or not the charging of the auxiliary battery AB can be executed while the vehicle is parked on the basis of the SOC decrease amount estimated by the SOC decrease amount estimation unit 91. More specifically, the lower limit SOC setting unit 92 sets as a lower limit SOC a value obtained by adding the SOC decrease value estimated by the SOC decrease amount estimation unit 91 to the SOC required to start the vehicle. The SOC required to start the vehicle is determined on the basis of power necessary to start the engine 2 by driving the MG1 with the inverter 22.

The charging control unit 93 for the auxiliary battery AB determines whether or not the charging of the auxiliary battery AB can be executed while the vehicle is parked on the basis of the lower limit SOC that has been set by the lower limit SOC setting unit 92. Where it is determined that the charging of the auxiliary battery AB can be executed while the vehicle is parked the charging control unit generates a drive command instructing to drive the DC/DC converter 31 and outputs the generated drive command to the MG-ECU 55. More specifically, the charging control unit 93 for the auxiliary battery AB receives from the timer IC 51 the measured value of the parking time that elapsed since the system start switch 81 has been switched OFF. Where the parking time exceeds a predetermined period of time (for example, 12 days), the charging control unit 93 for the auxiliary battery AB compares the SOC of the main power storage device MB with the lower limit SOC received from the lower limit SOC setting unit 92. Where the SOC of the main power storage device MB is higher than the lower limit SOC, the charging control unit outputs the drive command for the DC/DC converter 31 to the MG-ECU 55. When the SOC of the main power storage device MB is equal to or less than the lower limit SOC, the charging control unit 93 for the auxiliary battery AB does not output the drive command for the DC/DC converter 31 to the MG-ECU 55.

Figure 4:
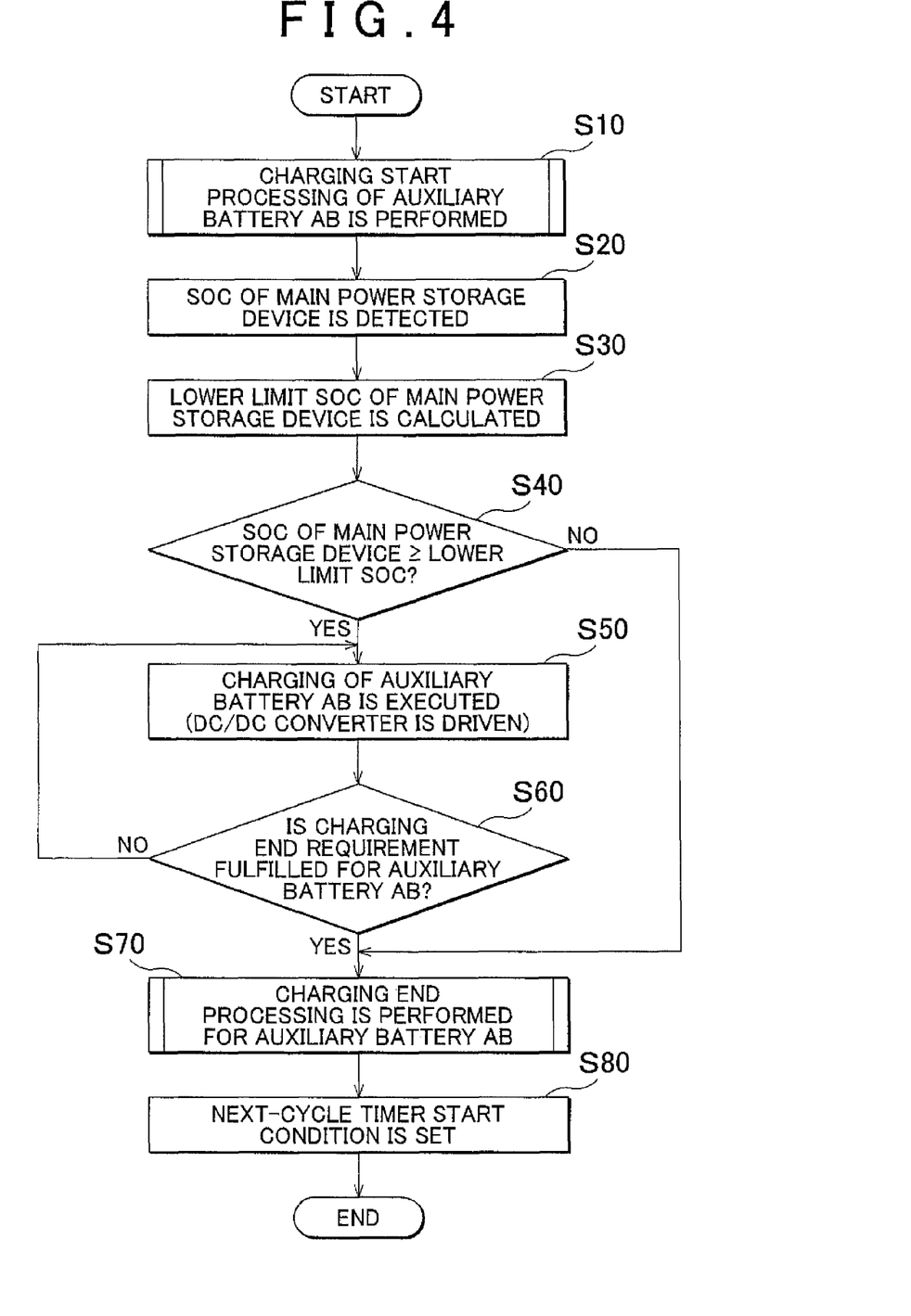
FIG. 4 is a flowchart for explaining the control processing procedure of charging the auxiliary battery AB while the vehicle is parked by using the power stored in the main power storage device MB which is executed by the controller according to Embodiment 1.

FIG. 4 is a flowchart for explaining the control processing procedure of charging the auxiliary battery AB while the vehicle is parked, which is executed by the controller 50. Referring to FIG. 4 and also FIG. 2, where the user switches OFF the system start switch 81, a subroutine for executing the start processing for charging the auxiliary battery AB while the vehicle is parked is called out (step S10).

Figure 5:
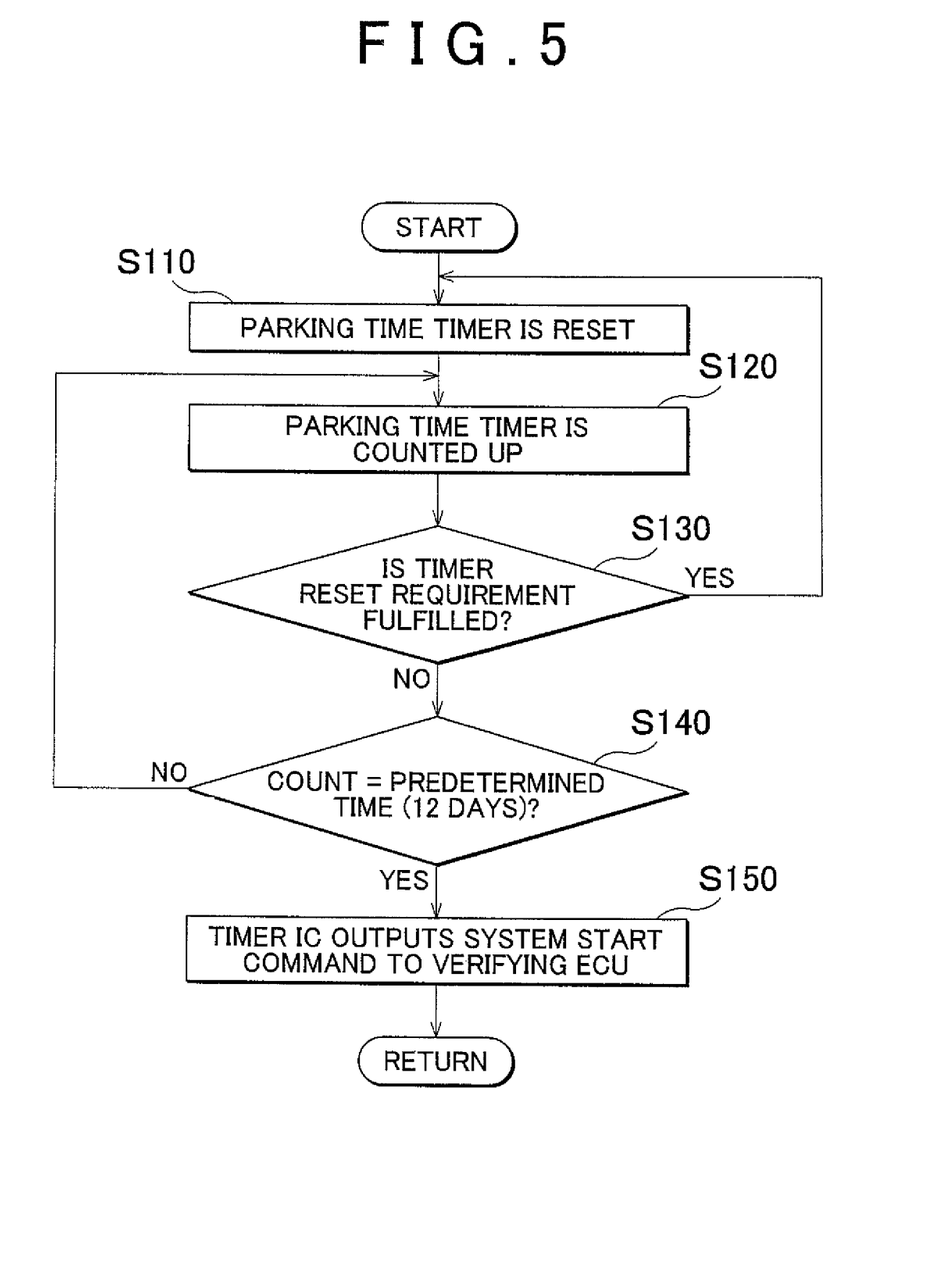
FIG. 5 is a flowchart for explaining the start processing procedure of charging the auxiliary battery AB while the vehicle is parked by using the power stored in the main power storage device MB which is executed in step S10 shown in FIG. 4.

FIG. 5 is a flowchart for explaining the start processing procedure of charging the auxiliary battery AB while the vehicle is parked, which is executed in step S10 shown in FIG. 4. Referring to FIG. 5 and also FIG. 2, first, the parking time timer for measuring the parking time of the vehicle 100 is reset in the timer IC 51 (step S110). Where the parking time timer is reset, the timer IC 51 initiates the count up of the parking time timer (step S120).

Then, the timer IC 51 determines whether or not the timer reset requirement is fulfilled (step S130). More specifically, where the system start switch 81 is switched ON, the timer reset requirement is fulfilled. Where it is determined that the timer reset requirement is fulfilled (YES in step S130), the processing returns to step S110.

Where it is determined in step S130 that the timer reset requirement is not fulfilled (NO in step S130), the timer IC 51 determines whether to not the value (referred to hereinbelow as "count value") of the parking time timer that has been counted up matches (or exceeds) a predetemiined value (for example, a value corresponding to 12 days) that has been set in the memory. Thus, it is determined whether or not the vehicle 100 has been allowed to stay in a parked state for a predetermined period of time (for example, 12 days).

Where it is determined that the count value does not match the predetermined value stored in the memory (does not exceed the predetermined value) (NO in step S140), the processing returns to step S120. Where it is determined that the count value matches the predetermined value stored in the memory (or exceeds the predetermined value) (YES in step S140), the timer IC 51 outputs a system start command to the verifying ECU 52 (step S150). Upon receiving the system start command, the verifying ECU 52 energizes the switch IGCT1. As a result, the HV integrated ECU 54 is started.

Referring again to FIG. 4, the HV integrated ECU 54 detects the SOC of the main power storage device MB on the basis of a signal from the battery ECU 56 (step S20). The SOC of the main power storage device MB may be calculated in the battery ECU 56 or may be calculated in the HV integrated ECU 54. The HV integrated ECU 54 then calculates the lower limit SOC of the main power storage device MB by the above-described method (step S30). In step S40, the HV integrated ECU 54 determines whether or not the SOC of the main power storage device MB determined in step S20 is equal to or higher than the lower limit SOC calculated in step S30.

Where it is determined that the SOC of the main power storage device MB is equal to or higher than the lower limit SOC (YES in step S40), the HV integrated ECU 54 energizes the switch IGCT2 and the system main relays SMRB, SMRG. Then, the HV integrated ECU 54 outputs a drive command for the DC/DC converter 31 to the MG-ECU 55 and actuates the DC/DC converter 31, thereby executing the charging of the auxiliary battery AB while the vehicle is parked (step S50).

In step S60, the HV integrated ECU 54 determines whether or not the end requirement for ending charge of the auxiliary battery AB is fulfilled while the vehicle is parked (step S60). For example, the end requirement corresponds to a state in which any door of the vehicle 100 is opened, or the execution time of charging the auxiliary battery AB while the vehicle is parked is equal to or longer than a predetermined time (for example, 10 min), or the SOC of the main power storage device MB is less than a predetermined value. The predetermined time (for example, 10 min) is determined in relation to the predetermined value (for example, a value corresponding to 12 days) of step S140 (FIG. 5). For example, when the time sufficient to charge the portion discharged within 12 days is 10 min, the predetermined time (10 min) is determined with respect to the predetermined value (12 days).

In the explanation above, the opening of a door is an example of the end requirement, but the cases in which an engine hood is opened, a door lock is released, a brake pedal is depressed, an auto alarm system is activated, and a remote key is detected may be also taken as the end requirements. In any of those cases, the user touches the vehicle, or the user is located close to the vehicle, or the user is anticipated to approach the vehicle according to the warning signal, and therefore the possibility of the vehicle being started by the user is apparently high. By so providing the end requirement, it is possible to charge the auxiliary battery AB while the vehicle is parked.

Where it is determined in step S60 that the end requirement for charging the auxiliary battery AB while the vehicle is parked is not fulfilled (NO in step S60), the processing returns to step S50. Meanwhile, where the end requirement for charging the auxiliary battery AB is fulfilled (YES in step S60), the end processing of charging the auxiliary battery AB is executed (step S70). More specifically, a stop command is output to the DC/DC converter 31, and the system main relays SMRB, SMRG are set to a cut-off state.

Where the end processing of charging the auxiliary battery AB is executed, the timer start condition of the next cycle is set (step S80). More specifically, when the charging of the auxiliary battery AB is interrupted or not started along the way, the timing for starting the charging of the auxiliary battery AB while the battery is parked in the next cycle is set such as to avoid, as effectively as possible, the depletion of the auxiliary battery AB.

Meanwhile where it is determined in step S40 that the SOC of the main power storage device MB is less than the lower limit SOC (NO in step S40), the HV integrated ECU 54 advances the processing to step S70. Thus, when the SOC of the main power storage device MB is lower than the lower limit SOC, the HV integrated ECU 54 does not energize the switch IGCT2 and the system main relays SMRB, SMRG, does not drive the DC/DC converter 31, and does not execute the charging of the auxiliary battery AB while the vehicle is parked.

As described hereinabove, in Embodiment 1, the SOC decrease amount of the main power storage device MB in the remaining parking period of time until the vehicle 100 is started is estimated, and the lower limit SOC is set on the basis of the estimated SOC decrease amount. Thus, it is not needed to increase unnecessarily the lower limit SOC to prevent the main power storage device MB from discharging, and whether the charging control of the auxiliary battery AB can be performed while the vehicle is parked is adequately determined with consideration for the SOC decrease amount in the remaining period of time. Therefore, in Embodiment 1, the depletion of power in the auxiliary battery AB can be inhibited.

Embodiment 2 of the present invention is explained below. Since the starting ability of the engine 2 and the power that can be output from the main power storage device MB change with temperature, the SOC required to start the engine, which represents the SOC necessary to start the engine 2, also changes with temperature. Accordingly, in Embodiment 2, the lower limit SOC is adjusted on the basis of the outside air temperature.

Figure 6:
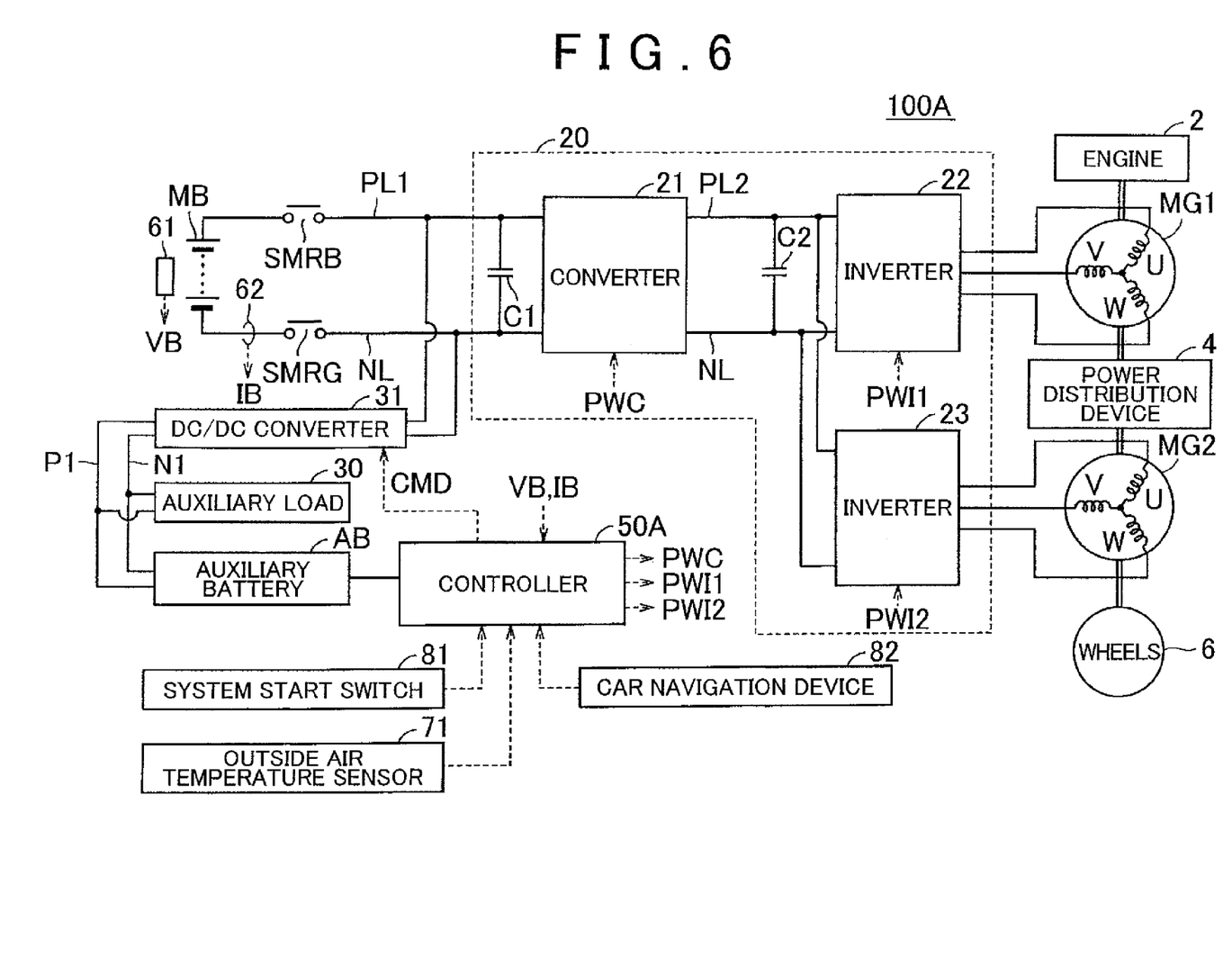
FIG. 6 shows the entire configuration of the vehicle carrying the power source system according to Embodiment 2.

FIG. 6 shows the entire configuration of the vehicle carrying the power source system according to Embodiment 2. Referring to FIG. 6, a vehicle 100A has the configuration of the vehicle 100 shown in FIG. 1 which is further provided with an outside air temperature sensor 71 and in which a controller 50A is used instead of the controller 50.

The outside air temperature sensor 71 detects the outside air temperature around the vehicle 100A and outputs the detected value to the controller 50A. The detected value of the outside air temperature sensor 71 is used to estimate the temperature of the engine 2 and the main power storage device MB when it is determined whether the charging of the auxiliary battery AB can be executed while the vehicle is parked. An engine water temperature sensor that detects the temperature of cooling water of the engine 2, and/or a temperature sensor that detects the temperature of the main power storage unit MB may be used instead of the outside air temperature sensor 71.

Similarly to the controller 50 in Embodiment 1, the controller 50A controls the system main relays SMRB, SMRG, PCU 20, engine 2, and DC/DC converter 31 by software processing in which the program that has been stored in advance is executed with the CPU, and/or by hardware processing performed by an electronic circuit.

The controller 50A determines whether the charging of the auxiliary battery AB can be executed while the vehicle is parked and executes the charging control of the auxiliary battery AB when it is determined that the auxiliary battery AB can be charged while the vehicle is parked, basically by the same method as that used by the controller 50 in Embodiment 1. Accordingly, the controller 50A adjusts the lower limit SOC for determining whether the auxiliary battery AB can be charged while the vehicle is parked on the basis of the detected value of the outside air temperature received from the outside air temperature sensor 71. More specifically, the lower limit SOC is adjusted such that the lower limit SOC increases with the decrease in the outside air temperature. Other features of the controller 50A are basically the same as those of the controller 50 of Embodiment 1.

Figure 7:
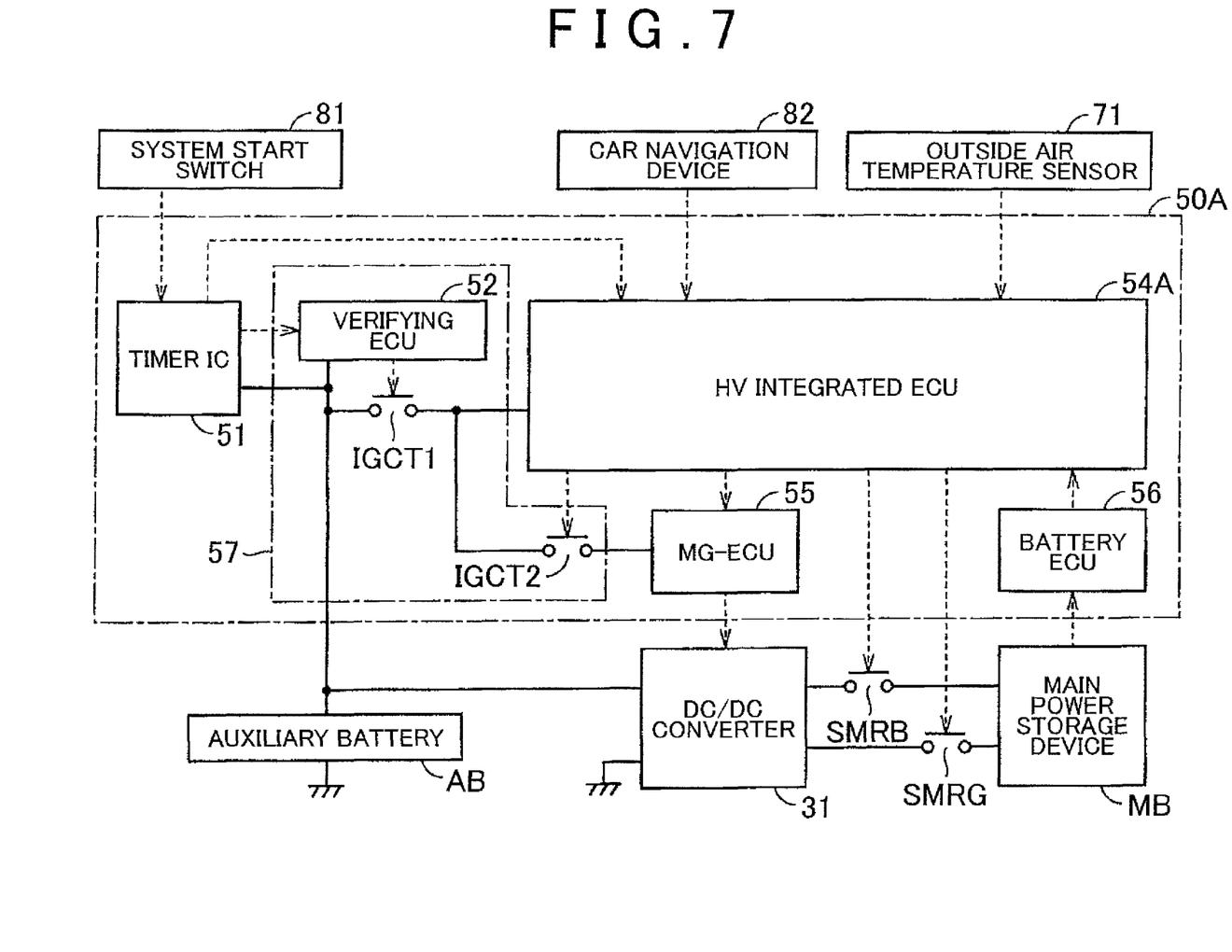
FIG. 7 shows in detail the configuration of the controller in Embodiment 2 shown in FIG. 6.
Figure 8:
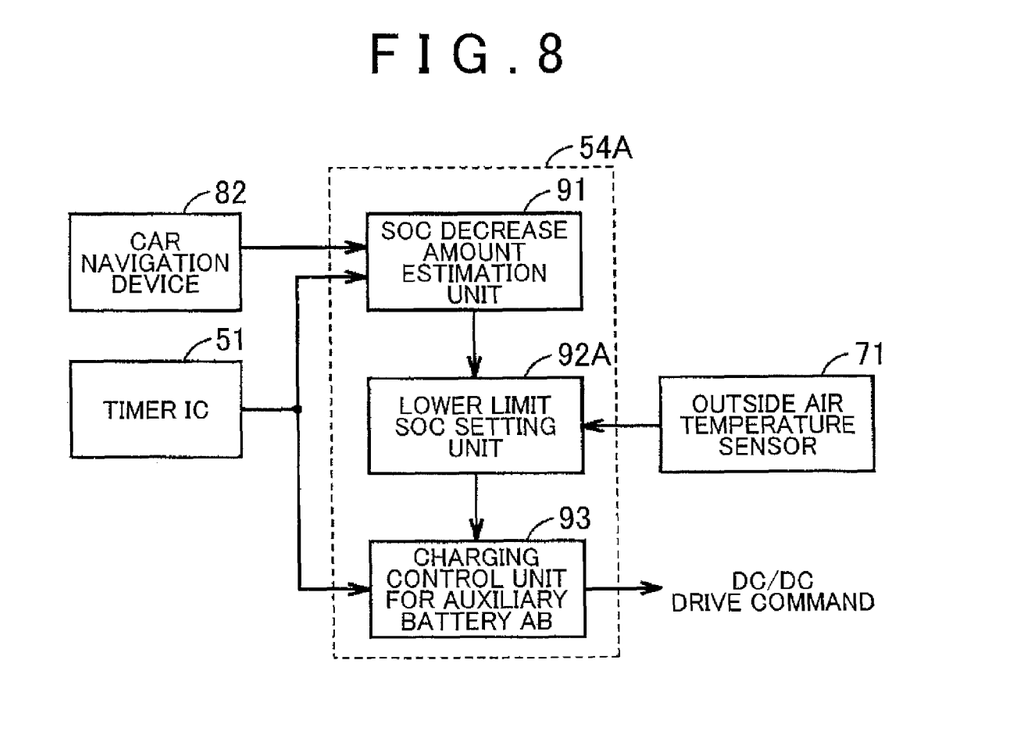
FIG. 8 is a functional block diagram of the portion of the HV integrated ECU shown in FIG. 7, which relates to charging the auxiliary battery AB while the vehicle is parked by using the power stored in the main power storage device MB.

FIG. 7 shows in detail the configuration of the controller 50A in Embodiment 2 shown in FIG. 6. Referring to FIG. 7, the controller 50A of Embodiment 2 includes a HV integrated ECU 54A instead of the HV integrated ECU 54 in the configuration of the controller 50 of Embodiment 1 shown in FIG. 2. FIG. 8 is a functional block diagram of the portion of the HV integrated ECU 54A shown in FIG. 7, which relates to charging the auxiliary battery AB while the vehicle is parked.

Referring to FIG. 8 and also FIG. 7, the HV integrated ECU 54A has the configuration of the HV integrated ECU 54 of Embodiment 1 shown in FIG. 3, in which a lower limit SOC setting unit 92A is used instead of the lower limit SOC setting unit 92. The lower limit SOC setting unit 92A sets the lower limit SOC on the basis of the SOC decrease amount estimated by the SOC decrease amount estimation unit 91. More specifically, the lower limit SOC setting unit 92A sets as the lower limit SOC a value obtained by adding the SOC decrease amount estimated by the SOC decrease amount estimation unit 91 to the SOC required to start the engine.

The SOC required to start the engine is determined on the basis of the engine start power, which is the power necessary to start the engine 2, and output power Wont that can be output by the main power storage device MB. In this case, the lower limit SOC setting unit 92A sets the engine start power and the output power Wout of the main power storage device MB on the basis of the outside air temperature detected by the outside air temperature sensor 71.

Figure 9:
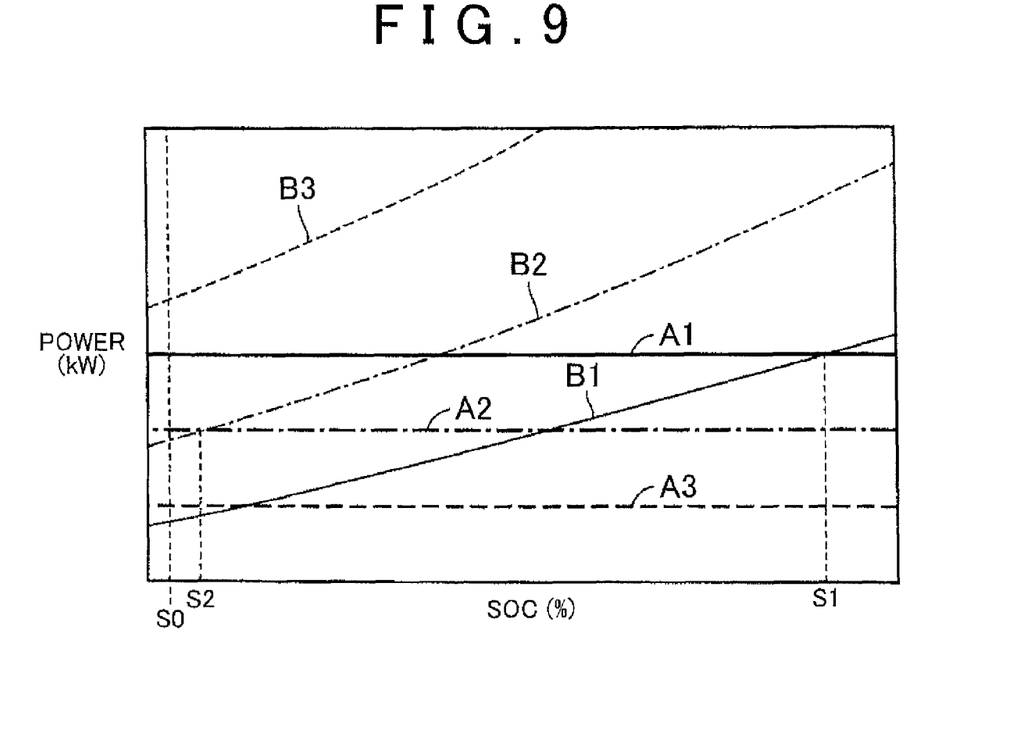
FIG. 9 shows the SOC required to start the engine.

FIG. 9 is a drawing for explaining the SOC required to start the engine. In FIG. 9, the SOC of the main power storage device MB is plotted against the ordinate. Lines A1 to A3 show the engine start power at an outside air temperature of −30° C., −25° C., and −20° C., respectively. Thus, the lower limit SOC setting unit 92A sets the engine start power such that the engine start power increases with the decrease in the outside air temperature. Lines B1 to B3 show the output power Wont that can be output by the main power storage device MB at an outside air temperature of −30° C., −25° C., and −20° C., respectively. Thus, the lower limit SOC setting unit 92A sets the output power Wout such that the output power Wout decreases with the decrease in the outside air temperature.

Further, the lower limit SOC setting unit 92A determines a value S1 of the SOC at the intersection of the line B1 with the line A1 as the SOC required to start the engine when the outside air temperature is −30° C. Likewise, the lower limit SOC setting unit 92A determines a value S2 of the SOC at the intersection of the line B2 with the line A2 as the SOC required to start the engine when the outside air temperature is −25° C. When the outside air temperature is −20° C., the output power Wout of the main power source device MB is sufficient as the engine start power. Therefore, the lower limit SOC setting unit 92A sets the SOC required to start the engine as the lower limit value S0.

Referring again to FIG. 8, the lower limit SOC setting unit 92A sets as the lower limit SOC a value obtained by adding a SOC decrease amount estimated by the SOC decrease amount estimation unit 91 to the SOC required to start the engine, which is set in the above-described manner. Other features of the HV integrated ECU 54A are the same as those of the HV integrated ECU 54 shown in FIG. 3.

As described hereinabove, in Embodiment 2, the lower limit SOC is adjusted on the basis of the outside air temperature. Therefore, the decrease in temperature can be prevented from inhibiting the start of the engine 2, while suppressing the depletion of power in the auxiliary battery AB.

In the above-described embodiments, the lower limit SOC is set on the basis of the SOC decrease amount of the main power storage device MB, and it is determined whether or not to execute the charging of the auxiliary battery AB while the vehicle is parked on the basis of the estimated lower limit SOC. However, the voltage of the main power storage device MB may be also used instead of the SOC. Thus, it is possible to set a lower limit voltage on the basis of the voltage decrease amount of the main power storage device MB in the remaining period of time of the parking period of the vehicle 100 and to determine whether or not to execute the charging of the auxiliary battery AB while the vehicle is parked on the basis of the lower limit voltage that has thus been, set.

Further, in the above-described embodiments, the vehicle 100 is a HV carrying the MG1 and MG2 and engine 2 as the drive sources, but the present invention is not limited to HV such as described hereinabove and also includes an electric automobile carrying the engine 2 or a vehicle carrying also a fuel cell as an energy source. Further, the PCU 20 is described to include the converter 21, but the invention is also applicable to vehicles carrying a PCU that does not include the converter 21.

In the description above, the main power storage device MB corresponds to an example of the "first power storage device" in the invention, and the auxiliary battery AB corresponds to an example of the "second power storage device" in the invention. Further, the DC/DC converter 31 corresponds to an example of the "voltage converter" in the invention, and the outside air temperature sensor 71 corresponds to an example of the "detector" in the invention. Furthermore, the PCU 20 and the MG2 correspond to an example of the "drive device" in the invention. The car navigation device 82 corresponds to an example of the "input device" in the invention.

It is to be understood that the embodiments disclosed herein are exemplary and non-limiting in all of the aspects thereof. The scope of the invention is indicated in the appended claims rather than the foregoing description of embodiments, and all changes that come within the meaning and the range of equivalents thereof are intended to be included therein.

What is claimed is:

1. A power source system for a vehicle, the power source system comprising:
 a first power storage device configured to store power to be used for running the vehicle;
 a second power storage device configured to store power to be used for an auxiliary device;
 a voltage converter provided between the first power storage device and the second power storage device, the voltage converter configured to perform voltage conversion of power output from the first power storage device and charge the second power storage device; and
 a controller configured to:
 (a) execute a charging control in which the second power storage device is charged by the voltage converter when a parking time of the vehicle exceeds a predetermined period of time,
 (b) estimate a decrease amount in a state of charge of the first power storage device in a time period from after elapse of the predetermined period of time until a start of the vehicle,
 (c) set a lower limit of the state of charge based on the decrease amount, and
 (d) not execute the charging control when the state of charge is lower than the lower limit.

2. The power source system according to claim 1, wherein the controller is configured to execute the charging control in a case where the state of charge is equal to or greater than the lower limit when the parking time of the vehicle exceeds the predetermined period of time; and
 the controller is configured not to execute the charging control in a case where the state of charge is less than the lower limit when the parking time exceeds the predetermined period of time.

3. The power source system according to claim 1, further comprising:
 an input device configured to set, by user input, a scheduled parking time that extends from a time at which parking of the vehicle is initiated until a time at which the vehicle is started, wherein
 the controller is configured to calculate the time period from when the predetermined period elapses until the start of the vehicle by subtracting the predetermined period of time from the scheduled parking time.

4. The power source system according to claim 1, further comprising:
 a detector configured to detect information relating to an air temperature outside the vehicle, wherein
 the controller is configured to adjust the lower limit of the state of charge based on the information relating to the air temperature outside the vehicle.

5. The power source system according to claim 4, wherein the controller is configured to adjust the lower limit of the state of charge so as to increase in proportion to a decrease in the outside air temperature.

6. The power source system according to claim 1, wherein the first power storage device supplies power to a starter of the vehicle which starts an internal combustion engine of the vehicle, wherein the controller is configured to set the lower limit of the state of charge based on the decrease amount and the state of charge at which the internal combustion engine is started by the starter.

7. The power source system according to claim 6, further comprising:
a detector configured to detect information relating to an air temperature outside the vehicle, wherein
the controller is configured to set a first power and a second power based on the information relating to the air temperature outside the vehicle, and
the controller is configured to set the state of charge at which the internal combustion engine is started based on the first power and the second power, the first power is power necessary to start the internal combustion engine, and the second power is power output by the first power storage device.

8. The power source system according to claim 7, wherein
the controller is configured to set the first power to increase and the second power to decrease in proportion to a decrease in the outside air temperature.

9. A vehicle comprising:
a power source system; and
a drive device configured to receive power from the power source system to generate drive power;
the power source system comprising:
a first power storage device configured to store power to be used for running the vehicle;
a second power storage device configured to store power to be used for an auxiliary device;
a voltage converter provided between the first power storage device and the second power storage device, and the voltage converter configured to perform voltage conversion of power output from the first power storage device and charge the second power storage device; and
a controller configured to:
(a) execute a charging control in which the second power storage device is charged by the voltage converter when a parking time of the vehicle exceeds a predetermined period of time,
(b) estimate a decrease amount in a state of charge of the first power storage device in a time period from after elapse of the predetermined period of time until a start of the vehicle,
(c) set a lower limit of the state of charge based on the decrease amount, and
(d) not execute the charging control when the state of charge is lower than the lower limit.

10. A control method for a vehicle including a first power storage device configured to store power to be used for running the vehicle and a second power storage device configured to store power to be used for an auxiliary device, the control method comprising:
performing voltage conversion of power output from the first power storage device with a voltage converter;
charging the second power storage device with the power converted by the voltage converter in a case where a parking time of the vehicle exceeds a predetermined period of time; and
performing no charging of the second power storage device when a state of charge of the first power storage device is lower than a lower limit of the state of charge, the lower limit determined based on a decrease amount of the state of charge estimated to occur within a time period from elapse of the predetermined period of time until a start of the vehicle.

* * * * *